United States Patent

Gorski et al.

Patent Number: 5,249,666
Date of Patent: Oct. 5, 1993

[54] LOAD COMPENSATOR FOR GEARED HOLDBACK DEVICES

[75] Inventors: John R. Gorski, Foxpoint; R. William Hankes, West Allis, both of Wis.

[73] Assignee: The Falk Corporation, Milwaukee, Wis.

[21] Appl. No.: 862,938

[22] Filed: Apr. 3, 1992

[51] Int. Cl.⁵ .................. B65G 23/00; F16D 67/00
[52] U.S. Cl. .................. 198/832.2; 192/8 R; 74/411.5; 188/82.84
[58] Field of Search ............ 192/7, 8 R, 4 B; 74/410, 411.5, 401, 403, 421 R; 188/82.84; 198/832.2

[56] References Cited

U.S. PATENT DOCUMENTS

| | | | |
|---|---|---|---|
| 2,372,026 | 3/1942 | Smith | 188/82 |
| 2,397,126 | 3/1946 | Buhrendorf | 74/403 X |
| 3,596,740 | 8/1971 | Nau | 192/8 R X |
| 3,695,402 | 10/1972 | Klemm | 192/8 |
| 3,994,178 | 11/1976 | Hore | 192/8 R X |
| 4,332,312 | 6/1982 | Sabel et al. | 74/411.5 X |
| 4,370,896 | 2/1983 | Harkfeld et al. | 74/411.5 X |
| 4,697,672 | 10/1987 | Linton | 188/134 |
| 4,697,675 | 10/1987 | Johnson, III et al. | 192/7 |
| 4,811,655 | 3/1989 | Janiszewski | 192/7 X |
| 4,864,882 | 9/1989 | Capewell | 74/411.5 |
| 5,063,808 | 11/1991 | Hill | 74/411.5 |

Primary Examiner—Leslie A. Braun
Assistant Examiner—Andrea Pitts
Attorney, Agent, or Firm—Ted E. Killingsworth; James A. Wanner

[57] ABSTRACT

A holdback system is provided which allows additional rotation of a shaft following actuation of an associated holdback device. That additional rotation of a shaft permits other associated holdbacks to actuate. This additional rotation of a rotatable shaft, such as a shaft of a speed reducer, is accomplished by providing a helical gear of a speed reducer mechanism in gear mesh relation with a helical gear of a speed reducer and, in addition, allowing the driven helical gear of the holdback mechanism to move axially after the holdback mechanism is actuated. This axial movement permits the driving helical gear of the speed reducer to rotate by a preselected amount and allow the entire system to move a slight degree in the reverse direction. This reverse movement permits other later actuated holdbacks to actuate and share the overall load with the earliest actuating holdback.

25 Claims, 9 Drawing Sheets

LOAD COMPENSATOR FOR GEARED HOLDBACK DEVICES

BACKGROUND OF THE INVENTION

1. Field of the Invention

The present invention relates generally to a holdback device for rotary equipment and, more particularly, an apparatus which permits a preselected amount of additional rotation of a rotatable shaft in a reverse direction following the engagement of its holdback device for the purpose of permitting another rotatable shaft to rotate an additional amount to permit its holdback device to actuate.

2. Description of Prior Art

When more than one holdback device is utilized in association with a conveyor or similar apparatus, it is desirable that all of the holdback devices actuate when reverse movement of the conveyor device occurs. If the plurality of holdback devices are not synchronous and one actuates before the other holdback devices, it may stop the backward movement of the conveyor prior to the actuation of the other holdback devices and therefore must absorb all of the reverse forces being exerted by the conveyor system. In other words, the earliest holdback device to actuate when reverse movement of the conveyor occurs is forced to stop the movement of the entire conveyor system without help from other holdback devices because of the fact that the other holdback devices have not yet actuated and will not actuate since the conveyor is no longer moving backward as a result of the holding action provided from the earliest holdback device to actuate.

Many devices are known to those skilled in the art of mechanical equipment design that are provided for the purpose of stopping the rotation of one element relative to another element. For example, U.S. Pat. No. 4,697,672, which issued to Linton on Oct. 6, 1987, discloses a bi-directional force limiting no-back mechanism which includes both a rotatable and axially shiftable shaft with a plate secured thereto. Two ratchet wheels are coaxial with the shaft and relatively rotatable with respect to the shaft. The ratchet wheels sandwich a plate and have peripheral ratchet teeth. Pawls are engageable with the ratchet teeth on respective ones of the ratchet wheels and first and second sets of force limiting teeth are disposed on the sides of the ratchet wheels opposite the plate.

U.S. Pat. No. 2,372,026, which issued to Smith on Mar. 20, 1945, discloses a hoist load brake. It provides a roller ratchet mechanism that is suitable for use in a hoist load brake. Provision is made for automatically compelling a substantially uniform distribution of the braking load throughout a series of rollers so that individual rollers will not be damaged by having a disproportionate portion of a load inadvertently applied to them. It also provides a spring arrangement for yieldably biasing the ratchet rollers in such manner as to insure positive and rapid action without jamming by Permitting a wide latitude of tolerance in the dimensioning of the pockets which receive the rollers.

U.S. Pat. No. 3,695,402, issued to Klemm on Oct. 3, 1972, discloses a plunger stopped bi-directional no-back assembly that comprises a rotatable output member, a rotatable drive member for rotating the output member in either direction and a releasable brake for substantially preventing rotation of the output member in either direction when it is not being driven by the drive member. This device provides an apparatus on the drive member that is operable to release the brake upon a predetermined rotation of the drive member in either direction.

When a plurality of holdback devices, or no-back devices, are utilized in tandem to cooperate for the purpose of preventing reverse motion of a conveyor system or the like, non-synchronous actuation of the holdback devices creates a disadvantageous situation wherein one of the holdback devices must bear a disproportionate share of the load required to prevent further reverse operation of the conveyor apparatus. The earliest holdback device that actuates when reverse motion occurs acts to prevent further reverse motion. This stoppage of reverse motion by the earliest acting holdback device also prevents actuation of other holdback devices in most cases because those other holdback devices require a slightly additional reverse motion to cause them to actuate. Because of variations during their manufacture and as a normal result of machining tolerances, it is normal to expect one of the plurality of associated holdback devices to actuate before the others actuate. As a result, the earliest actuating holdback device is therefore forced to carry a large portion of the total load and, perhaps, the entire load if the other holdback devices are not actuated at all. A significant benefit could be realized if holdback devices were constructed in a manner that would permit all of the associated holdback devices to be actuated when the conveyor apparatus begins to move in a reverse direction. If all the associated holdback devices are actuated, they will all share the load and reduce the forces that would otherwise be experienced by a single holdback device that is forced to withstand the entire load of the conveyor system alone.

Applicants also filed another application, given Ser. No. 07/862,935, on the same day that this application was filed, assigned to the same assignee, also relating to holdback devices, but of different construction.

SUMMARY OF THE INVENTION

As described above, the use of multiple holdback devices associated with a common apparatus, such as a conveyor system, creates the possibility that one of the holdback devices will actuate before other associated holdbacks actuate and, therefore, be forced to withstand the entire force of the apparatus and prevent further movement in a reverse direction. In order to solve this problem, the present invention permits the driving shaft associated with the first actuated holdback device to rotate by a limited variable amount following its actuation so that the conveyor system can continue to move in a reverse direction a distance adequate for the other holdback devices to be actuated by that slight amount of continued reverse movement. The present invention is. generally associated with a speed reducing gear arrangement that comprises a plurality of rotatable shafts, wherein each of the rotatable shafts has one or more gears attached to it.

In a preferred embodiment of the present invention, a holdback apparatus comprises a first helical driving gear that is connected to a rotatable shaft. A second helical driven gear is associated in tooth mesh relation with the first helical gear. The present invention additionally provides a means for inhibiting the rotation of the second helical gear. That inhibiting means, which is generally a no-back apparatus that employs either a roller/ramp device or a sprag device, is connected in torque transmitting relation with the second helical gear. Furthermore, the present invention provides a means for permitting the second helical gear to move a limited distance in a direction along its axis of rotation following the actuation of the inhibiting means. In other words, when the second helical gear is inhibited from rotating about its axis of rotation, the present invention permits the second helical gear to move in a direction along its axis of rotation. As described above, the inhibiting means can either comprise a plurality of rollers associated with a plurality of ramps or, alternatively, it can comprise a plurality of sprag elements. In a preferred embodiment of the present invention, a means is provided for resisting movement of the second helical gear along its axis of rotation following actuation of its inhibiting means. In practice, the resistance may be provided by hydraulic means, compression springs or other means. In a most preferred embodiment of the present invention, this resisting means comprises one or more Belleville compression springs.

The operating philosophy of the present invention is to permit a slight degree of additional rotation of a shaft following the actuation of a holdback device associated with that shaft. That small amount of additional rotation following actuation permits reverse movement of the conveyor apparatus following the actuation of the inhibiting means. This additional reverse movement, in turn, permits other holdback devices to subsequently actuate and share the overall restraining load which would otherwise have to be borne by the earliest actuating holdback.

BRIEF DESCRIPTION OF THE DRAWINGS

The present invention will be more fully understood from a reading of the description of the preferred embodiment in conjunction with the drawing, in which.

DESCRIPTION OF THE PREFERRED EMBODIMENT

Figure 1:
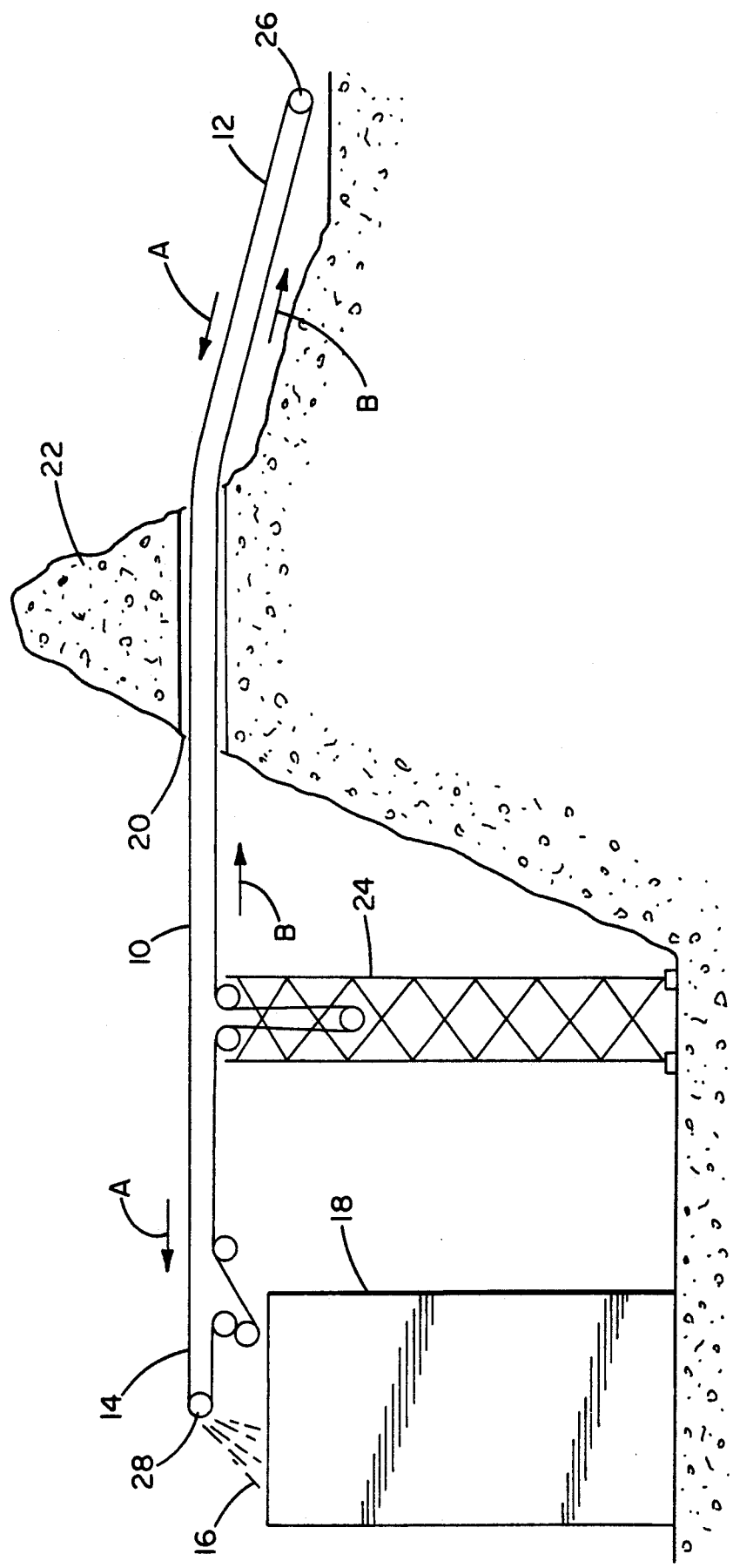
FIG. 1 illustrates a typical application of a conveyor system for which the present invention is applicable.

Throughout the description of the preferred embodiment, like components will be identified with like reference numerals.

FIG. 1 illustrates a typical application where a long conveyor belt is used to transport material from one position to another. The exemplary illustration of FIG. 1 shows a conveyor belt 10 extending from a tail end 12, that would typically be located proximate a mine entrance, to a head end 14 that is generally located proximate a destination for ore or other material being transported by the conveyor system. In the particular illustration of FIG. 1, the material, identified by reference numeral 16, represents ore or other loose material that is being conveyed to a silo 18. For purposes of this illustration, the conveyor 10 is shown extending through a tunnel 20 in a hill or mountain 22.

During operation, the conveyor 10 moves in the direction indicated by the arrows with the loose material, such as ore, being transported from the tail end 12 in the direction indicated by arrows A with the empty conveyor belt returning in the direction represented by arrows B. For the purpose of maintaining the tightness of the conveyor belt 10, a takeup system is provided as represented by reference numeral 24.

Typically, a plurality of speed reducer drives is used to provide the motive force for the conveyor belt 10. Although the drives can be located at any one of several possible locations along the belt, this illustration will be discussed in terms of a conveyor belt having at least one speed reducer drive associated with a pulley at the tail end 12. That pulley is identified by reference numeral 26. Furthermore, another speed reducer drive is associated with the head Pulley identified by reference numeral 28 at the head end 14 of the conveyor belt.

It must be understood that conveyor belt systems such as that illustrated in FIG. 1 can extend over great distances. For example, conveyor belts over 21,000 feet in length have been used to transport coal from a mine entrance to a silo 18. In systems of this size, belt stretching can present a severe problem. In fact, it has been seen that deformations of the conveyor belt 10 have occurred in excess of 0.8% of the belt length per year. In a conveyor belt system that is 21,000 feet long, this represents a deformation of approximately 336 feet. A generally related problem with conveyor belt systems relates to the fact that, when the conveyor belt is used to move material from one elevation to a higher elevation, a failure in the drive system can be followed by a backward or reverse movement of the belt under the force provided by the weight of loose material remaining on the belt when drive power of the motors is absent.

In order to prevent backward movement of the belt caused by the force of the material on the belt, holdback devices are provided in association with the speed reducers that are used to drive the belt. The holdback devices, which will be described in greater detail below, are arranged in such a way that the initial reverse movement of the belt causes the holdback devices to be actuated to inhibit further reverse rotation of the rotatable shafts in the speed reducer gear set. When the motor drive power is absent and the conveyor belt 10 begins to move backward, the holdback devices require some small amount of reverse rotation to cause their actuation. Because of differences in manufacturing tolerances between different holdback devices, they do not always actuate simultaneously with each other. Instead, one device actuates before the other. If the earliest actuating holdback device stops the movement of the belt before the other holdback device is actuated, the earliest acting holdback device will have to provide sufficient force to prevent the conveyor belt from moving backward and will not have the assistance of the other holdback device which remains unactuated. This condition presents serious problems in the design and operation of a conveyor system such as the one shown in FIG. 1. For example, the excessive forces resulting from this condition can cause damage to the earliest actuated holdback device. In addition, these situations require that each of the holdback devices associated with the conveyor belt must be designed to be able to withstand the full force of the belt since it cannot be assumed that both of the holdback devices will be actuated following any loss of power to the motors driving the speed reducers. This results in an overdesign of the holdback devices and the speed reducer gear boxes, including shafting, couplings and pulleys, and consequently added expense.

Figure 2:
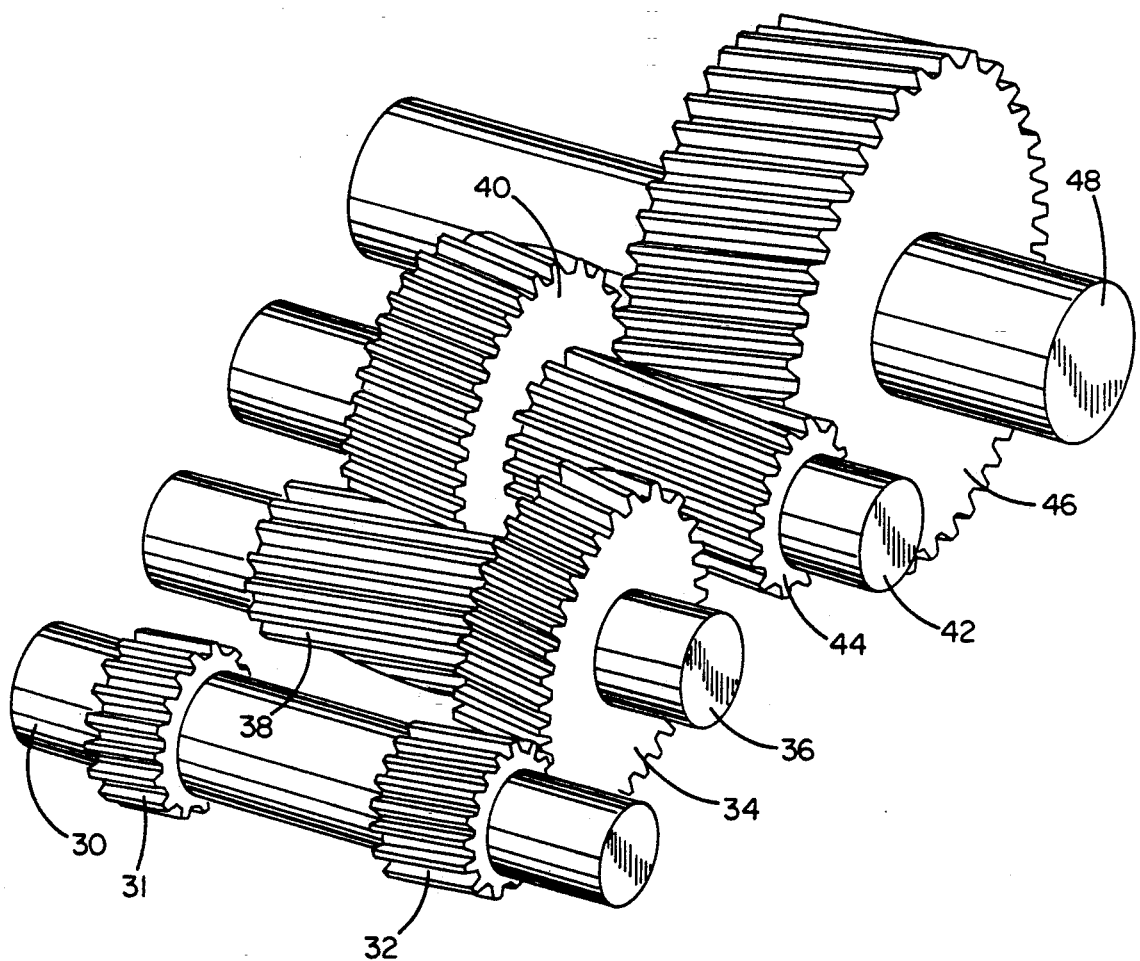
FIG. 2 illustrates the arrangement of a plurality of shafts and gears of a speed reducer gearbox.

Preferably, a speed reducer drive or gearbox is associated with each of the pulleys 26 and 28. In order to more fully understand the operation of the present invention, the general operation of a speed reducer drive should be understood. The arrangement shown in FIG. 2 represents the operative elements of a speed reducer, or torque increaser, shown without the frame, housing or bearings. However, it should be understood each of the rotatable shafts shown in FIG. 2 is supported at its ends with bearings that are, in turn, supported in a frame structure.

In FIG. 2, a first rotatable shaft 30 is provided with a helical gear 32. As can be seen, another helical gear 31 is also shown associated with the first rotatable shaft 30. Gear 31 is not in the power train and could be used as the for the idler shaft 52 with the shown in FIG. 3 if so desired. Depending on housing design, the idler shaft gear 50, could mesh with any of the drive gear train members, shown in FIG. 2. Helical gear 32 is connected in mesh relation with helical gear 34 which, in turn, is rigidly attached to a second rotatable shaft 36. Also connected to the second rotatable shaft 36 is helical gear 38. Helical gear 38 is in mesh relation with helical gear 40 which, in turn, is rigidly attached to a third rotatable shaft 42 which has helical gear 44 rigidly attached to it. Helical gear 44 is arranged in mesh relation with helical gear 46 and helical gear 46 is rigidly attached to a fourth rotatable shaft 48. When the first rotatable shaft 30 is connected to a source of motive power, such as an electric motor, the torque is transmitted through the series of meshing gear pairs to the fourth rotatable shaft 48. Therefore, in the speed reducer arrangement shown in FIG. 2, the first rotatable shaft 30 is an input shaft and the fourth rotatable shaft 48 is an output shaft that could be connected to a drum such as drums 26 and 28 illustrated in FIG. 1. The series of gear mesh relationships shown in FIG. 2 provide a significant speed reduction and torque increase. However, it should be understood that the invention may also be used in a speed increasing gearbox.

The present invention provides a holdback mechanism that can be associated with one of the rotatable shafts of a speed reducer. It should be understood that each of the four rotatable shafts shown in FIG. 2 rotates at a different speed and experiences a different torque than the other rotatable shafts. Therefore, the specific location of the present invention should be determined based on the speed and torque characteristics under which the present invention is intended to operate. In the following illustration, the present invention will be described in conjunction with its association with the second rotatable shaft 36 and helical gear 34. However, it should also be clearly understood that the present invention could alternatively be associated for operation with other rotatable shafts shown in FIG. 2.

Figure 3:
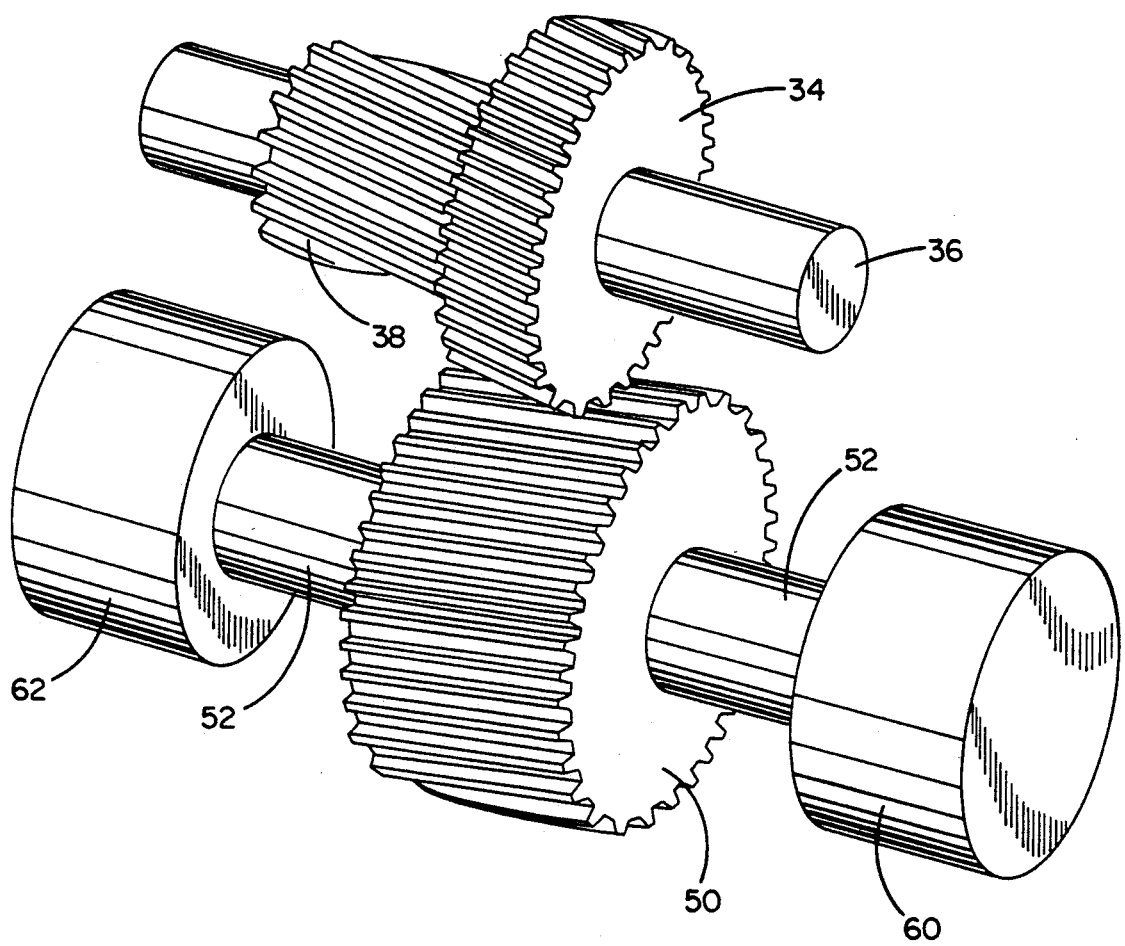
FIG. 3 illustrates the association between one shaft of a speed reducer and the present invention.

In FIG. 3, the second rotatable shaft 36 and its helical gears 34 and 38 are shown. The existence of helical gear 38 is not directly relevant to the operation of the present invention. The present invention comprises an arrangement of shafts, gears and holdbacks arranged in a manner that will be described below.

The present invention comprises helical control gear 50 which is associated with a rotatable axially movable shaft 52 and as illustrated herein meshes with helical gear 34, though it could mesh with another gear. Connected to one end of shaft 52 is a holdback device 60. Connected to the other end of shaft 52 is a yieldable shaft mounting 62 that will be described in more detail below. The arrangement of the components of the shaft mounting 62 in FIG. 3 permits the present invention to operate in its intended manner. More specifically, those components permit a restrained axial movement of the rotatable shaft 52 following the actuation of the holdback mechanism 60. The components identified by reference numerals 60 and 62 in FIG. 3 will be described in greater detail below.

Figure 4A:
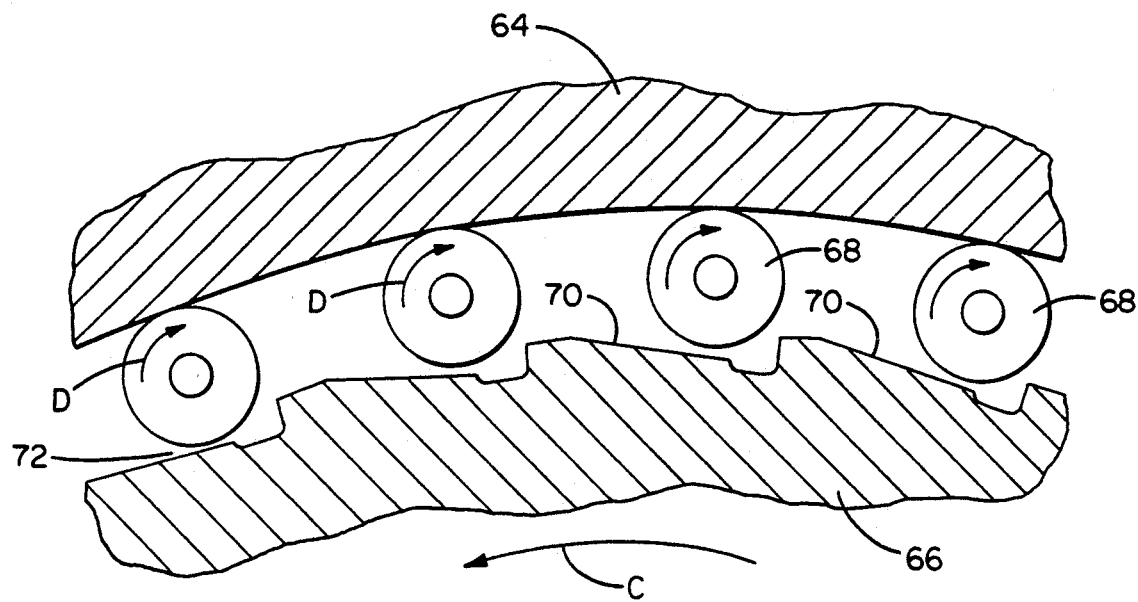
FIG. 4A illustrates a roller-type holdback device in a unactuated state.
Figure 4B:
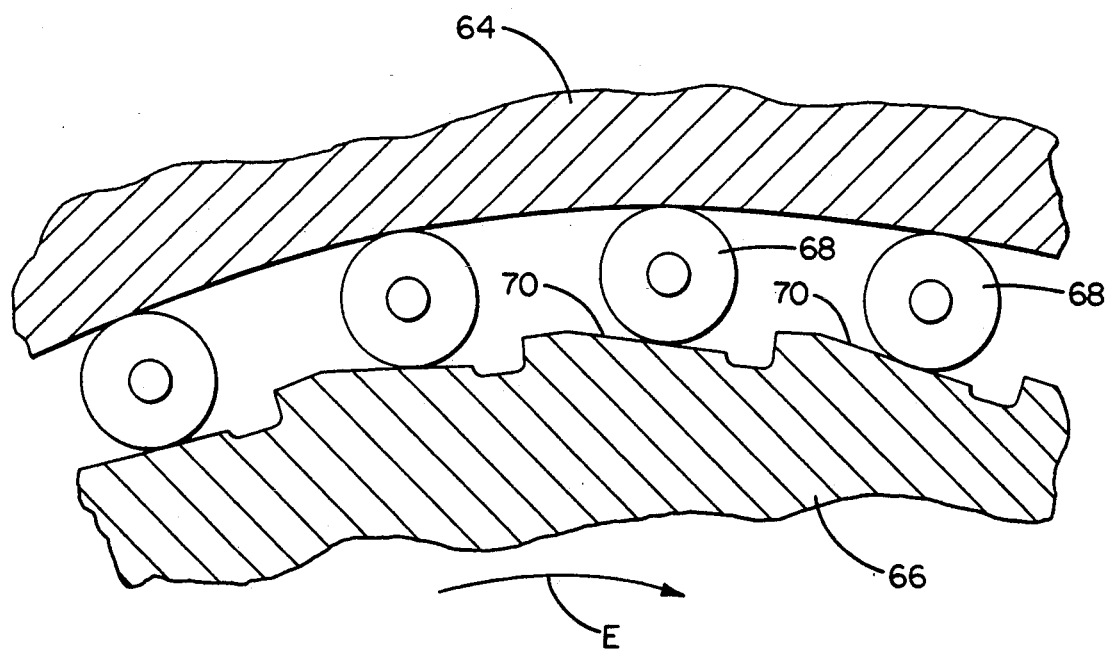
FIG. 4B shows a roller-type holdback in an actuated state.

Before describing the operation of the present invention in greater detail, two typical holdback devices should be described. In FIG. 4A, a roller/ramp holdback device is illustrated. More particularly, the holdback is illustrated in a nonactuated arrangement in FIG. 4A. In a typical arrangement, the outer race 64 is stationary and the inner cam 66 rotates in the direction illustrated by arrow C. A plurality of rollers 68 are arranged in association with ramps 70 and normally rotate in the counterclockwise direction indicated by arrows D. As can be seen, a clearance 72 exists between each roller 68 and its associated ramp 70. When operating in the manner illustrated in FIG. 4A, the rollers offer little or no resistance to the rotation of the inner cam 66. However, if the inner cam 66 begins to rotate in the clockwise direction illustrated by arrow E in FIG. 4B, the rollers 68 move up their associated ramps 70 and are jammed between the inner cylindrical surface of the nonrotatable outer race 64 and the ramp surface of their associated ramp 70. This creates a very high resistive force that operates to prevent further rotation of the inner cam 66 in the direction indicated by arrow E. As with most types of holdback devices, it should be understood that a certain amount of rotation in the direction indicated by arrow E is required before the rollers 68 are jammed between the ramp 70 and the outer race 64. During that limited amount of reverse rotation, any device or apparatus connected to the inner cam 66 such as a drive pulley of a conveyor will move in a reverse direction for a slight amount prior to the actuation of the holdback arrangement. It should also be understood that, because of environmental circumstances and manufacturing tolerances which differ between different individual holdback devices, the specific magnitude of reverse rotation necessary to cause actuation of a particular holdback device can vary from one holdback to another.

Figure 5A:
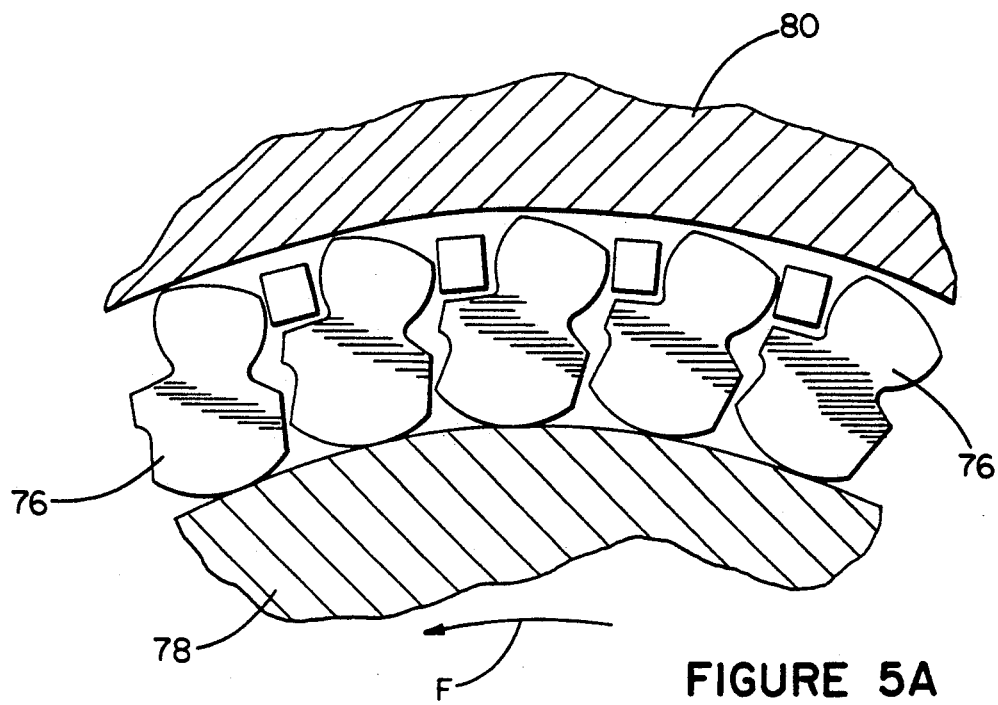
FIG. 5A shows a sprag-type holdback device in an unactuated state.
Figure 5B:
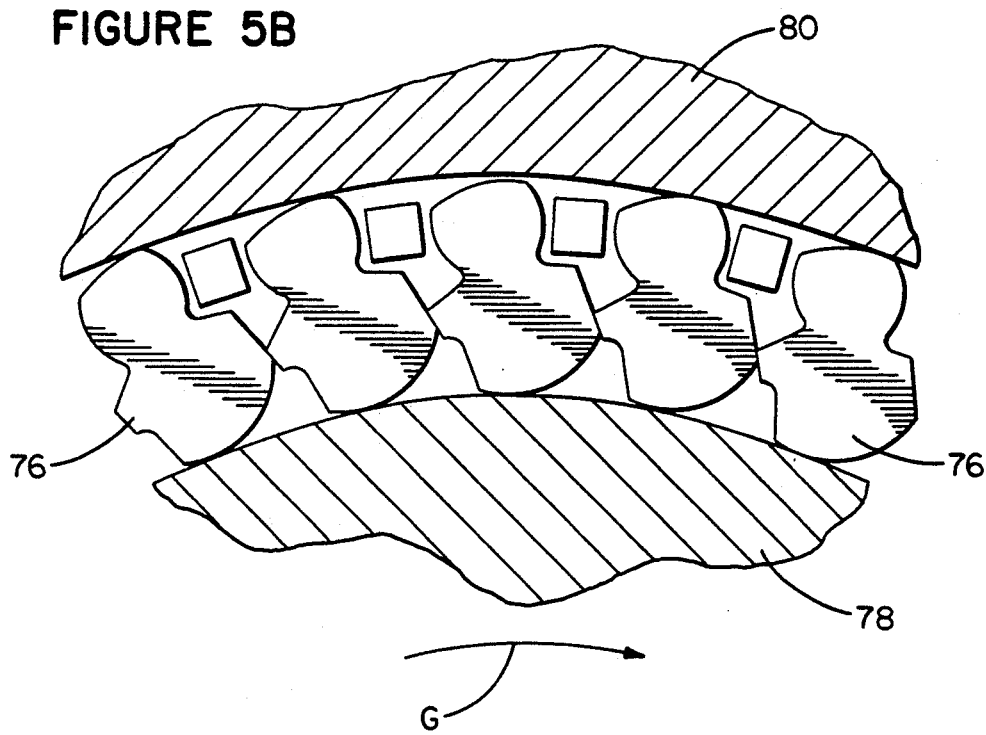
FIG. 5B shows a sprag-type holdback device in an actuated state.

FIGS. 5A and 5B illustrate the operation of a different type of holdback mechanism. It is generally referred to as a sprag holdback or clutch. Although many arrangements of sprag clutches can be configured, FIG. 5A illustrates a plurality of sprags 76 located between an inner member 78 and an outer member 80. For this illustration, it will be assumed that the outer member 80 is stationary and the inner member rotates in the direction of arrow F. When rotating in the direction of arrow F, the sprags experience a slight clearance between their radially inward surfaces and the outer cylindrical surface of the member 78. Therefore, they offered little or no resistance to the rotation of the inner member 78. However, if the direction of rotation of the inner member 78 reverses and proceeds in the direction indicated by arrow G in FIG. 5B, the sprags 76 are caused to shift position and jam between the outer cylindrical surface of the inner member 78 and the inner cylindrical surface of the outer member 80. This creates a significant resistance to continued reverse movement of the inner member 78 in the direction indicated by arrow G. As should be readily apparent from the illustration shown in FIGS. 5A and 5B, the sprags 76 require some finite magnitude of rotation in the reverse direction shown by arrow G before creating the jamming required to inhibit further rotation. Because of machining tolerances and other variables associated with the manufacture and operation of the holdback device, different individual holdback devices can require slightly different magnitudes of reverse direction before they are fully actuated.

The different magnitudes of rotation necessary to actuate different holdbacks, as illustrated and described above with reference to FIGS. 4A, 4B, 5A, and 5B, create the problem described above relating to the different amounts of rotation required for actuation of associated holdbacks arranged in connection with a common mechanical system, such as a conveyor system. Since one holdback may have already actuated during the time when another holdback has not yet actuated, the first actuating holdback can be forced to withstand the entire force provided in a reverse direction by a conveyor system if that holdback device stops the conveyor system before the other holdback device actuates. The present invention is directed specifically to overcoming this Problem by Permitting all of the holdbacks associated with a common conveyor system to actuate fully to stop reverse motion of the conveyor or other driven device(s) associated with the holdback devices, thereby assuring that the load is shared by all of the holdbacks.

Figure 6:
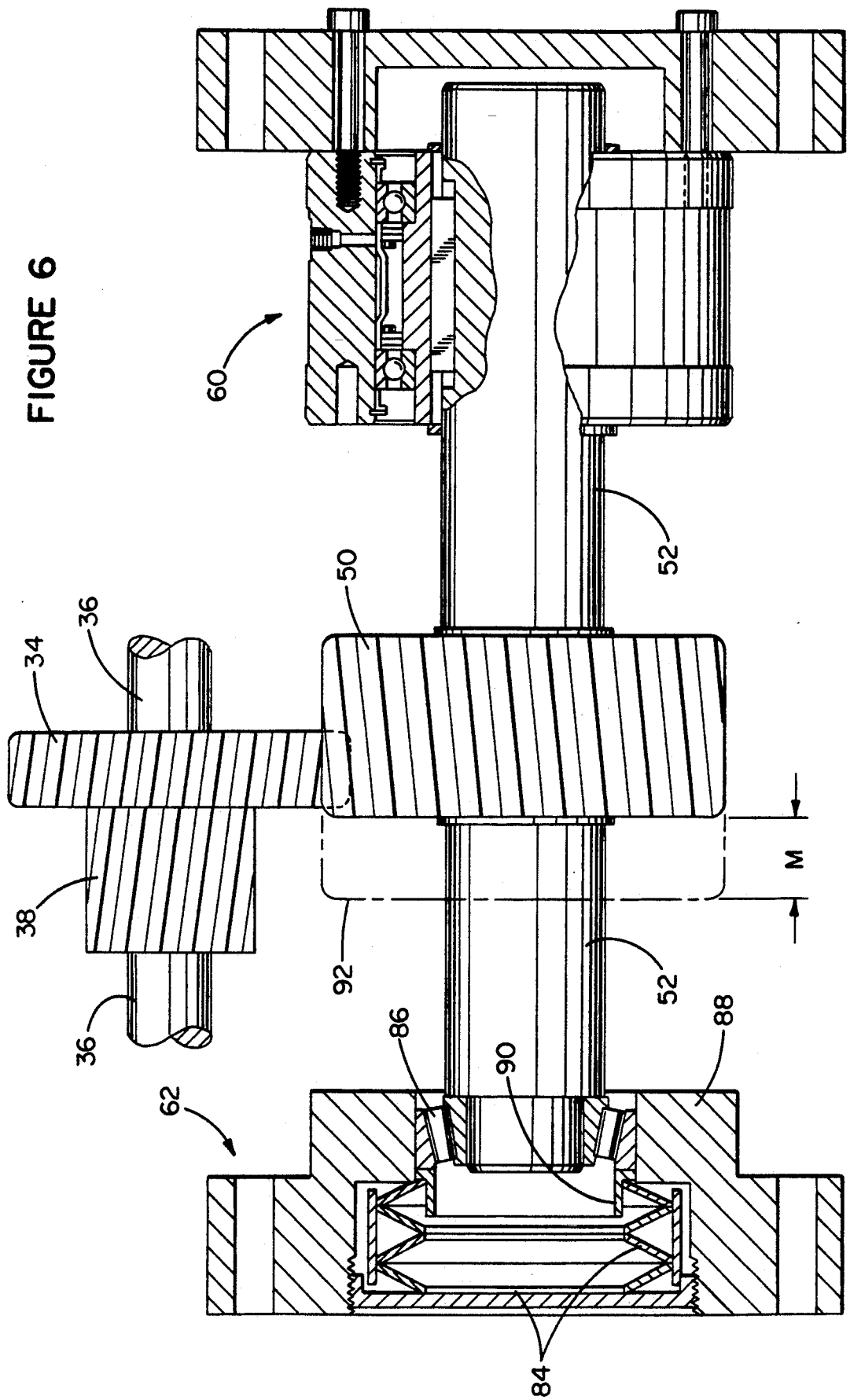
FIG. 6 is a detailed illustration of the operation of the present invention.

A more detailed illustration of the invention is provided in FIG. 6. FIG. 6 is intended to show the individual components of the assembly shown more generally in FIG. 3. The helical gear 50 is attached to the shaft 52 which, in turn, is associated with the holdback device 60 and the associated spring members contained in the component identified by reference numeral 62. It should be understood that the devices identified by reference numerals 60 and 62 are also shown in FIG. 3.

With continued reference to FIG. 6, it should be understood that the holdback device contained in the component identified by reference numeral 60 can incorporate either roller/ramp holdback techniques or sprag-type holdback techniques. The right end of shaft 52 is slidably mounted (for example, keyed or splined) to the inner holdback member so that the two rotate together, but the shaft may move axially relative to the holdback. The specific type of holdback used in association with the present invention is not critical to its operation as long as the holdback technique employed is capable of preventing reverse rotation of a shaft, such as rotatable shaft 52 in FIGS. 3 and 6. In FIG. 6, helical gear 34 is shown arranged in gear mesh relation with helical gear 50 in a manner similar to that illustrated in FIG. 3. It should be understood that the general function of the holdback 60 in this type of application is to prevent rotatable shaft 36 from rotating in a reverse direction. Since rotatable shaft 36 is arranged with several other rotatable shafts, as illustrated in FIG. 2, in a gear mesh association, the stoppage of rotatable shaft 36 in FIG. 6 will have the effect of stopping the rotation of all of the rotatable shafts in a speed reducer arrangement such as that which is typically used in a conveyor belt drive system. Therefore, for purposes of this description, only rotatable shaft 36 and its associated helical gear 34 will be illustrated in FIG. 6 in association with the present invention.

In the component identified by reference numeral 62 in FIG. 6, several Belleville compression springs 84 are shown arranged to resist the axial movement of shaft 52 in a direction toward the left of FIG. 6. As can be seen, rotatable shaft 52 is supported at one end by bearing 86 in the shaft support 62 and at the other end by bearings within the holdback 60. The bearing 86 is arranged to permit the transfer of axial force from rotatable shaft 52 toward the support structure 88 which, in turn, has a collar 90 that is arranged to compress the springs 84 when the rotatable shaft 52 moves axially toward the left in FIG. 6.

It should be understood that helical gear 50 is rigidly attached to rotatable shaft 52 and both of these components can move axially relative to the devices identified by reference numerals 60 and 62. Therefore, while helical gear 34 and rotatable shaft 36 are axially stationary, helical gear 50 and rotatable shaft 52 are axially movable. This is further illustrated by dashed line 92 that demonstrates the fact that helical gear 50 can move axially in a direction toward the left in FIG. 6 by a length generally represented by reference character M.

If helical gear 50 is caused to move axially while being inhibited from rotating about its central axis of rotation, a gear which is in mesh with helical gear 50 but inhibited from moving axially, must rotate about its central axis of rotation. Therefore, if the holdback mechanism 60 inhibits rotatable shaft 52 from rotating about its central axis and helical gear 50 is permitted to move axially toward the left in FIG. 6, helical gear 34 will be permitted to rotate about its central axis. This, in turn, will permit rotatable shaft 36 to rotate. As a result, all of the rotatable shafts which are associated in gear mesh relation with the rotatable shaft 36, such as those illustrated in FIG. 2, will be permitted to rotate. This results in the output shaft of the speed reducer being allowed to rotate, thus permitting the conveyer belt to move in a reverse direction by some additional small magnitude. The advantage of this slight additional reverse movement will be described in greater detail below. However, it should be appreciated that an axial movement of helical gear 50 while helical gear 50 is restrained from rotation will permit helical gear 34 to rotate since it is prevented from moving axially.

While the structure of the present invention shown in FIG. 6 permits axial movement of the rotatable shaft 52 and the helical gear 50, it should be understood that these components are not permitted to move axially in an uninhabited manner. Instead, the compression springs 84 or other yieldable restraints are used to restrict the motion and provide a predetermined magnitude of resistive force against the leftward movement of rotatable shaft 52. The compression springs 84 also operate to restore the axial position of helical gear 50 when forward rotation of the gearset shafts begins again. Although not shown in specific detail in FIG. 6, it should be understood that the axial position of the compression springs 84 can be adjusted to permit alteration of the magnitude of force Provided against the rotatable shaft 52. In addition, although four compression springs 84 are shown in FIG. 6, the specific number of springs and their particular arrangement in the component identified by reference numeral 62 should not be considered limiting to the overall description of the present invention.

It is important to realize that, by permitting the rotatable shaft 36 to rotate an additional amount in the reverse direction, the entire conveyor system is permitted to move a slight additional amount in a reverse direction and thereby allow other holdback devices associated with the conveyor system to actuate and assist in resisting further reverse movement of the conveyor system. Therefore, the earliest actuated holdback is not required to withstand the entire force of the conveyor system. Instead, the later actuating holdback devices associated with a conveyor system are permitted the slight additional reverse movement necessary to cause their holdbacks to actuate and Permit those later actuating holdback devices to assist the earliest actuated holdback device in preventing further reverse movement of the conveyor system.

In operation, after the earliest actuated holdback device is actuated, its helical gear is prevented from rotating due to the operation of either the roller/ramp mechanism or the sprag-type mechanism. With reference to FIG. 6, this means that the helical gear 50 is Prevented from rotating because of the action of the holdback device 60. However, because of the forces exerted by the conveyor system in a reverse direction, which are described above, the rotatable shaft 36 experiences rotational torque in the reverse direction. If the rotatable shaft 52 and the helical gear 50 are not Permitted to move axially, the helical gear 34 and rotatable shaft 36 will be prevented from rotating and the entire force exerted in a reverse direction by the conveyor system borne by the holdback mechanism 60 associated with the earliest actuating holdback device. However, because the helical gear 50 is permitted to move in an axial direction as indicated by dashed line 92 in FIG. 6, the axial movement of the helical gear 50 permits rotational movement of helical gear 34 and, therefore, rotatable shaft 36. This additional rotational movement of rotatable shaft 36 permits the entire conveyor system to move by a slight additional amount in a reverse direction and thus permits the other holdbacks associated with a conveyor to actuate either their roller/ramp mechanism or their sprag-type mechanism. After those later actuating holdback devices are actuated, they can assist in sharing the total load of the conveyor system and prevent the earliest actuating holdback mechanism from having to withstand the entire force of the conveyor in the reverse direction. The degree of movement, identified by reference numeral M in FIG. 6, of the rotatable shaft 52 is governed by the structure of the various components along with the spring force provided by the compression springs 84. It should be understood that a wide variation of forces can be achieved by selecting specific compression spring designs, the number of Belleville springs used in the system and the various positions of the components within the device identified by reference numeral 62 in FIG. 6.

Figure 7:
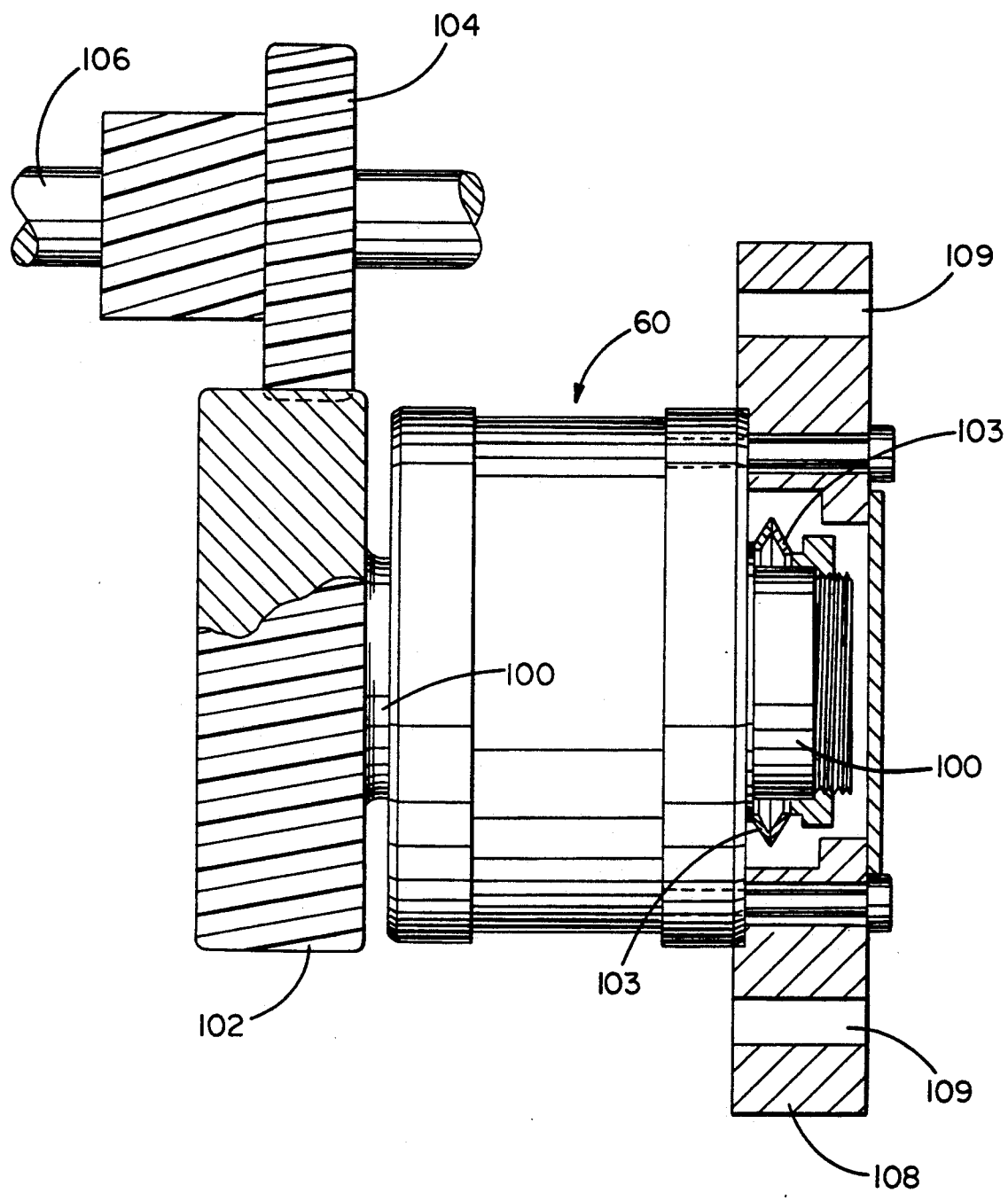
FIG. 7 illustrates an alternative embodiment of the present invention.

While FIG. 6 illustrates an embodiment of the present invention in which the rotatable shaft 52 is supported at both ends by bearing-like devices, certain applications may not afford the possibility of this type of support system. Therefore, accommodation can be made to adapt the basic concept of the present invention to other configurations such as a cantilevered shaft. FIG. 7 shows one such adaptation. As in FIG. 6, the holdback mechanism 60 in FIG. 7 is provided in association with a rotatable shaft 100 and a helical gear 102. That helical gear 102 is connected in gear mesh relation with a helical gear 104 which is part of a speed reducer system and operates in a manner identical to that of helical gear 34 shown in FIG. 6 and described above. Helical gear 104 in FIG. 7 is prohibited from moving axially but rotates as the rotatable shaft of the speed reducer rotate. The rotatable shaft 100 is axially movable, particularly when the helical gear 102 is prevented from rotating by the action of the holdback device 60. The right portion of the rotatable shaft 100 is associated with compression springs 103 in a manner similar to the application of compression springs 84 in FIG. 6. They resist movement of the rotatable shaft 100 toward the left with a predefined spring force exerted against the shaft in a direction toward the right in FIG. 7. This permits axial movement of the rotatable shaft 100 and the helical gear 102, but assures that this axial movement is controlled according to predetermined limits.

When helical gear 102 is prevented from rotating, as described above, by the action of the holdback mechanism 60, it is permitted to move axially against the force of the compression springs 104 in a direction toward the left in FIG. 7. When this axial movement occurs, the helical gear 104 is Permitted to rotate because of the gear mesh relationship between helical gears 102 and 104. In view of the fact that helical gear 104 experiences a rotational torque in the reverse direction as a result of its connection to the speed reducer gear set and the conveyor system, helical gear 104 will attempt to rotate in a reverse direction and, as a result, will induce the axial movement of helical gear 102 toward the left. The additional rotation of helical gear 104 and its associated rotatable shaft 106 will permit the entire speed reducer and the conveyor system to move a slight amount in the reverse direction and allow other non-actuated holdbacks to actuate as a result of that additional reverse movement. In the same manner as described above, the additional actuation of later actuating holdbacks will assist in sharing the overall load with the earliest actuating holdback.

Figure 8:
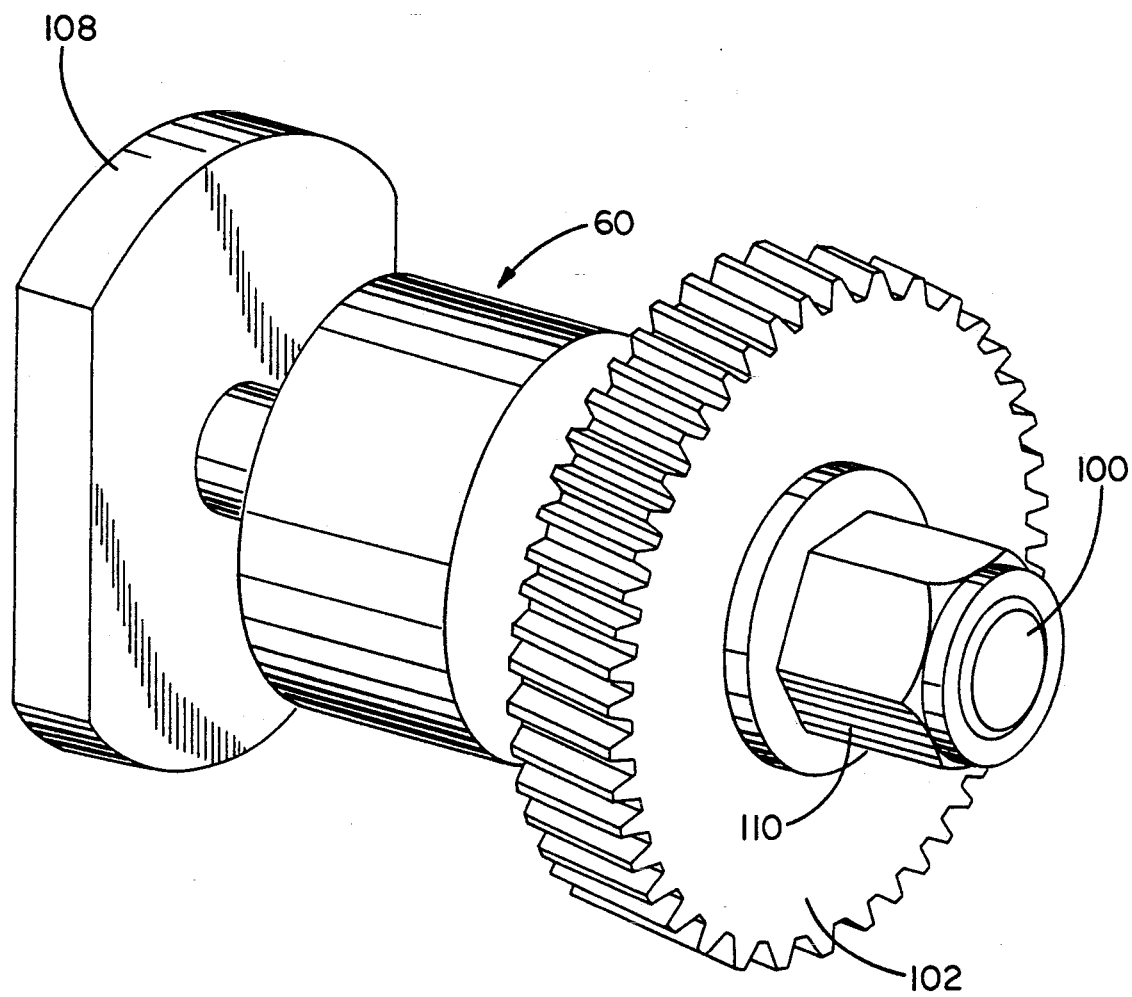
FIG. 8 shows an alternative illustration of the device shown in FIG. 7.

In FIGS. 7 and 8, reference numeral 108 has been used to identify a plate-like component that is utilized to house the compression springs of the present invention and having apertures 109 to permit attachment of the system and holdback 60 to the housing structure of a speed reducer. FIG. 8 shows another illustration of the device described above in conjunction with FIG. 7. Reference numeral 60 is used to identify the holdback mechanism which can be a roller/ramp device or a sprag-type device, as described above. In addition, it should be clearly understood that the holdback device of the present invention is not limited to these two alternatives.

In FIG. 8, it can be seen that the helical gear 102 is attached to the rotatable shaft 100 by a nut 110 in that particular embodiment. The helical gear 102 is axially movable along the central axis of rotatable shaft 100 as described above. It should be understood that the present invention can be incorporated in association with a speed reducer system in several different ways. Although two particular embodiments have been described above, one in association with FIG. 6 having bearing supports at two ends of rotatable shaft and one embodiment in association with FIGS. 7 and 8 having bearing supports with a cantilevered shaft, the present invention can be associated with many additional alternative embodiments.

Figure 9A:
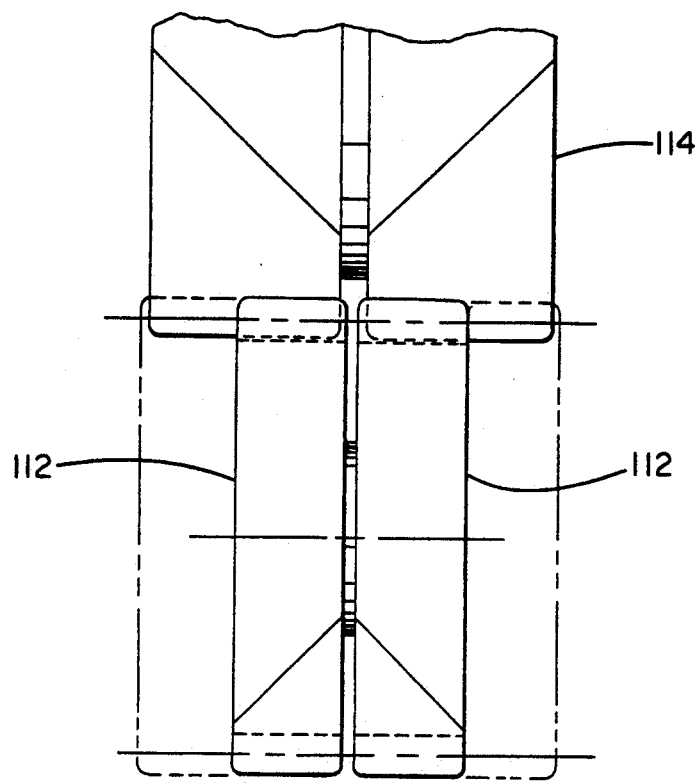
FIG. 9A illustrates another embodiment employing double helical holdback gears.
Figure 9B:
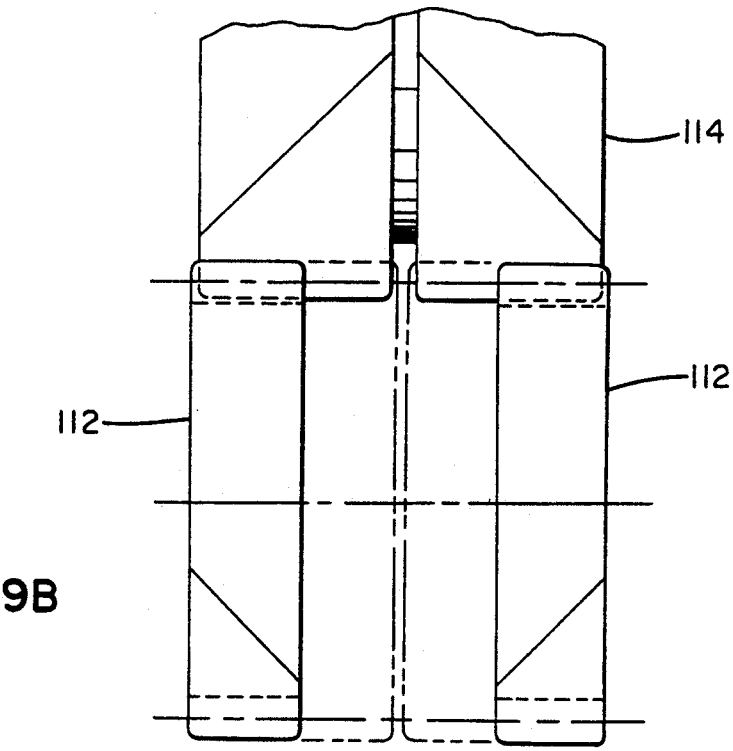
FIG. 9B illustrates an alternative embodiment employing double helical holdback gears which operate reversely relative to those in FIG. 9A.

Since drives utilizing holdback devices are, by definition, unidirectional, the same principle can be applied using opposed double helical elements as illustrated in FIGS. 9A and 9B. FIG. 9A illustrates outward axial movement of double helical elements and FIG. 9B illustrates inward axial movement of two helical elements under reverse loading of the conveyor.

Using opposed helix elements allows the use of large helix angles for greater rotational movement range. If both helical sections can move independently as illustrated, the relative axial movement for each section can be half of what would be required using a single helical element for the same allowable rotation of the mating gear. Because the axial forces of the two sections will be opposite and virtually equal, no axial thrust will be transferred to the shaft, bearings or the holdback, when mounted per FIG. 6 or 7. As in FIG. 6, the two section, axially movable elements 112 are arranged to operate in a manner similar to the single section axially movable gear 50. The mating double helical element 114 then operates in a manner similar to gear 34.

Although the present invention has been described with significant detail and different embodiments of the present invention have been illustrated and discussed above, it should be understood that the basic concepts of the present invention can be incorporated in many different embodiments and those alternative configurations should be considered to be within its scope The primary concept of the present invention is to permit a rotatable shaft to rotate a limited amount after an associated holdback has been actuated. This is accomplished by permitting the rotatable shaft of the holdback to move axially while being inhibited from moving rotationally because of the effect of the holdback. This axial movement of a helical gear associated with the holdback permits an associated speed reducer gear to rotate and allow a portion of a total system, such as a conveyor system, to move in a reverse direction for the purpose of permitting other holdbacks to actuate and share the load with the earliest actuated holdback.

What we claim is:

1. A holdback apparatus for a rotatable shaft, comprising:
   a first helical gear connected to said rotatable shaft having a first axis of rotation;
   a second helical gear mounted for rotation about a second axis of rotation and associated in tooth mesh relation with said first helical gear;
   said second helical gear being connected in torque transmitting relation with an inhibiting means wherein said inhibiting means inhibits a reverse rotation of said second helical gear;
   means for permitting said second helical gear to move a predefined distance in an axial direction along said second axis of rotation when said second helical gear is inhibited from reverse rotation about said second axis of rotation
   whereby slight degree of additional rotation of said shaft may be permitted when said inhibiting means inhibits reverse rotation of said second helical gear;
2. The holdback apparatus of claim 1, wherein: said inhibiting means comprises a plurality of rollers associated with a plurality of ramps.
3. The holdback apparatus of claim 1, wherein: said inhibiting means comprises a plurality of sprag elements.
4. The holdback apparatus of claim 1, wherein: said rotatable shaft is a component of a speed reducer.
5. The holdback apparatus of claim 1, further comprising:
   means for resisting movement of said second helical gear in said direction along said axis of rotation with a preselected magnitude of force.
6. The holdback apparatus of claim 5, wherein: said resisting means comprises a spring.
7. The holdback apparatus of claim 6, wherein: said spring is a compression spring.
8. A holdback apparatus for a gearbox, comprising:
   a rotatable input shaft of said gearbox, said first rotatable shaft being rotatable about a first axis of rotation;
   a second rotatable shaft of said gearbox, said second rotatable shaft being rotatable about a second axis of rotation, said first and second rotatable shafts being connected together in torque transmitting relation;
   a first helical gear attached to said second rotatable shaft for rotation about said second axis of rotation;
   a third rotatable shaft being rotatable about a third axis of rotation, said holdback being connected in torque transmitting relation with said third rotatable shaft to prevent reverse rotation;
   a second helical gear attached to said third rotatable shaft, said second helical gear being rotatable about said third axis of rotation, said first helical gear being disposed in mesh relation with said second helical gear;
   means for permitting said third rotatable shaft to move axially and for allowing said second rotatable shaft to rotate when said third rotatable shaft is inhibited from rotation; and
   means for yieldably resisting axial movement of said third rotatable shaft with a predetermined axial force.
9. The apparatus of claim 8, wherein: said holdback comprises a plurality of rollers and a plurality of ramp members.
10. The apparatus of claim 8, wherein: said holdback comprises a plurality of sprag members.
11. The apparatus of claim 8, wherein: said resisting means comprises a spring.
12. The apparatus of claim 11, wherein: said spring is a Belleville spring.
13. The apparatus of claim 8, including means limiting axial movement of the third shaft, and wherein said permitting and allowing means is configured to allow said second rotatable shaft to rotate a predetermined angular magnitude when said third rotatable shaft moves axially to its maximum limit of travel.
14. A holdback apparatus for a rotatable shaft, comprising:
   a first helical gear connected to said rotatable shaft having a first axis of rotation;
   a second helical gear associated in tooth mesh relation with said first helical gear mounted for rotation about a second axis of rotation and;
   said second helical gear being connected in torque transmiting relation wit inhibiting means wherein said inhibiting means inhibits a reverse rotation of said second helical gear; and means for permitting said first helical gear to rotate reversely a limited amount when said second helical gear is inhibited from rotating by said inhibiting means.

15. The holdback apparatus of claim 14, further comprising:

means for limiting said preselected magnitude of rotation of said first helical gear to a predetermined amount.

16. The holdback apparatus of claim 15, wherein:
said limiting means comprises a compression spring.

17. The holdback apparatus of claim 16, wherein:
said inhibiting means comprises a plurality of rollers associated with a plurality of ramps.

18. The holdback apparatus of claim 16, wherein:
said inhibiting means comprises a plurality of sprag members.

19. The holdback apparatus of claim 16, wherein:
said compression spring is a Belleville spring.

20. The holdback apparatus of claim 14, wherein:
said rotatable shaft is a component of a speed reducer.

21. A speed reducer gearbox for use in driving a conveyor belt at spaced intervals along a lengthy conveyor belt system and adapted to prevent uncontrolled reverse movement in the gearbox when input power is discontinued, comprising:

an input gear adapted for connection with a source of input power for rotating the input gear in one direction during power transmission;

a helical second gear in driven relationship with the input gear for transmitting power to a gearbox output;

a helical axially movable control gear in mesh with the second gear and normally rotatable with the second gear in idling relationship when the input gear rotates in said one direction during power transmission;

a unidirectional holdback device connected with the axially movable control gear including one member rotatable with the control gear and a concentric member held against rotation, together with one-way power transmission means cooperating with the rotatable and stationary members to allow idling rotation of the control gear during power transmission through the gearbox and activated by reverse rotation of the control gear to reverse rotation of the control gear and the second helical gear by an output load on the gearbox when input power to the gearbox is discontinued; and means yieldably mounting the control gear for limited axial movement relative to the unidirectional holdback device to allow limited reverse rotation of the second gear when the holdback device is activated.

22. A speed reducer gearbox as defined in claim 21 wherein:

said holdback device includes an inner member rotatable with the control gear, a concentric outer member held against rotation, and a plurality of elements disposed between the inner and outer members to permit idling rotation of the axially movable control gear during power transmission and to bind the two members together on reverse rotation of the control gear.

23. A speed reducer gearbox as defined in claim 22, wherein:

said elements disposed between the inner and outer members comprise a plurality of rollers engageable with a plurality of ramps.

24. A speed reducer gearbox as defined in claim 22, wherein:

said elements disposed between the inner and outer members comprise a plurality of sprag elements.

25. A conveyor system, comprising:

an endless conveyer belt of extensive length trained about belt drive pulleys at spaced intervals along the belt;

a speed reducer gearbox connected to drive each belt drive pulley and adapted to prevent uncontrolled reverse movement of the belt due to load on the belt when input power is discontinued, each gearbox comprising;

an input gear adapted for connection with a source of input power for rotating the input gear in one direction during power transmission;

a helical second gear in driven relationship with the input gear for transmitting power to a belt drive pulley;

a helical control gear in mesh with the second gear and normally rotatable with the helical second gear in idling relationship when the input gear rotates in said one direction during power transmission;

a unidirectional holdback device connected with the control gear including one member rot a with the control gear and one member held against rotation, together with one-way power transmission means cooperating with the rotatable and stationary members to allow idling rotation of the control gear during power transmission through the gearbox and activated by reverse rotation of the control gear to prevent reverse rotation of the control gear and the helical second gear by a load transmitted to the control gear by the pulley when input power to the gearbox is discontinued; and means yieldably mounting the control gear for limited axial movement relative to the rotatable holdback member to allow limited reverse rotation of the helical second gear when the holdback device is activated, thereby to permit limited movement of the belt adequate to assure activation of the holdback device in each gearbox so that the load on the belt is shared by each holdback device.

* * * * *